UNITED STATES PATENT OFFICE.

EDWARD D. GLEASON, OF NEW YORK, N. Y., ASSIGNOR, BY MESNE ASSIGNMENTS, TO NEU-METALS AND PROCESS COMPANY, OF LONG ISLAND CITY, NEW YORK, A CORPORATION OF NEW YORK.

PROCESS OF MAKING ALLOYS.

1,136,909.

Specification of Letters Patent.

Patented Apr. 20, 1915.

No Drawing. Application filed November 16, 1912. Serial No. 731,863.

*To all whom it may concern:*

Be it known that I, EDWARD D. GLEASON, of Brooklyn, in the county of Kings, city and State of New York, have invented a certain new and useful Improvement in Processes of Making Alloys, whereof the following is a specification.

My invention relates to the purifying and casting of copper and alloys thereof; the object of my invention being to eliminate oxygen and other gases which if allowed to remain render such castings porous.

The claims in this case are limited to a process of producing copper containing boron material, but such products are claimed in my copending application Serial 3382, which is a division of this case.

In practising my invention I incorporate boron in copper, as graphite exists in cast iron, by fusing them in a crucible, free from impurities, with a flux consisting of native calcium fluorid and fused boracic acid. For instance, in a crucible of magnesite, or graphite free from arsenic balls; I put three parts of calcium fluorid, and, on top of that, one part of fused vitrified boracic acid. I then fuse the same, preferably in an oxy-hydrogen furnace of ordinary commercial type, until the fused mass of said two ingredients has reached the proper consistency; which is manifested by dense fumes of boron fluorid arising from the crucible. I then pour into said fused mass molten copper at a temperature of about 2500 degrees F. or higher. Thereupon, the boron fluorid permeates the molten copper and when the latter is cooled the boron exists therein as graphite exists in cast iron.

It may be observed that it is impossible to obtain an equivalent effect by placing calcium fluorid and fused boracic acid on top of the molten copper, for, in that case, the mixture of said fluorid and acid simply acts as a cover to the copper in the form of a slag, the specific gravity thereof preventing it from sinking into the copper. Moreover, said fluorid and acid are of such nature that they cannot be successfully shot under the molten copper. However, said materials may be added to the molten copper, so as to react at the bottom thereof, by wrapping them in thin sheet copper and sinking the package in the molten copper.

It may be observed that it is essential to my process aforesaid that the gases in the form of boron fluorid shall pass through the molten copper, as otherwise the desired effect is not produced. In other words, the essential feature of the process contemplated is the injection of the boron fluorid into the copper, and this is conveniently effected by the boron fluorid rising into the copper from the subjacent mixture of calcium fluorid and vitrified boracic acid.

I do not desire to limit myself to the precise methods of procedure or proportions herein set forth, as it is obvious that various modifications may be made therein without departing from my invention as defined in the appended claims.

I claim:—

1. A process of producing copper containing boron material throughout its mass, which consists in fusing calcium fluorid and vitrified boracic acid together, adding copper thereto at a temperature of 2500 degrees F. and upward, maintaining the copper heated until boron material produced by the reaction of said fluorid and acid is occluded in the copper, and cooling the copper.

2. A process of producing copper containing boron material throughout its mass, which consists in occluding boron fluorid in copper at a temperature of 2500 degrees F. and upward, and cooling the copper while the fluorid is occluded therein.

3. A process of producing copper containing boron material, which consists in occluding boron fluorid in copper, and cooling the copper while the fluorid is occluded therein.

4. The process of producing copper containing boron material, which consists in occluding boron fluorid in copper.

5. A process of producing copper containing boron throughout its mass, which consists in fusing calcium fluorid and vitrified boracic acid together, adding copper thereto at a temperature of 2500 degrees F. and upward, maintaining the copper heated until boron fluorid produced by the reaction of said fluorid and acid is occluded in the copper, and cooling the copper.

6. A process of producing copper containing boron throughout its mass, which consists in occluding boron fluorid in copper at a temperature of 2500 degrees F. and upward, and cooling the copper while the fluorid is occluded therein.

7. A process of producing copper containing boron, which consists in occluding boron fluorid in copper, and cooling the copper while the fluorid is occluded therein.

8. A process of producing a homogeneous composition of copper and boron, which consists in occluding boron fluorid in molten copper, and cooling the same.

9. A process of producing copper retaining boron material distributed throughout its mass, which consists in subjecting molten copper to the atcion of boron fluorid.

10. A process of producing copper retaining boron material distributed throughout its mass, which consists in subjecting molten copper to the action of boron fluorid while the copper is at a temperature of 2500 degrees F. and upward.

11. The step in a process of producing copper retaining boron material distributed throughout its mass, which consists in subjecting molten copper to the action of boron fluorid formed by fusing calcium fluorid and vitrified boracic acid together beneath the copper.

In testimony whereof, I have hereunto signed my name at Brooklyn, New York, this 15th day of November, 1912.

EDWARD D. GLEASON.

Witnesses:
 HENRY J. MEYER,
 BENJAMIN ZEKOWSKI.